United States Patent [19]

Harms et al.

[11] Patent Number: 4,950,932
[45] Date of Patent: Aug. 21, 1990

[54] AXIAL FLOW FAN INTEGRAL WITH ELECTRONICALLY COMMUTATED MOTOR

[75] Inventors: Harold B. Harms; David M. Erdman, both of Fort Wayne, Ind.

[73] Assignee: General Electric Company, Fort Wayne, Ind.

[21] Appl. No.: 358,171

[22] Filed: May 30, 1989

[51] Int. Cl.$^5$ .......................... H02K 9/06; H02K 5/16
[52] U.S. Cl. .................................. 310/67 R; 310/156; 310/266
[58] Field of Search ....................... 310/67 R, 156, 266

[56] References Cited

U.S. PATENT DOCUMENTS

| | | | |
|---|---|---|---|
| 3,644,066 | 2/1972 | Heob et al. | 417/354 |
| 3,961,864 | 6/1976 | Papst et al. | 417/354 |
| 4,549,104 | 10/1985 | Niimura | 310/67 R |
| 4,554,491 | 11/1985 | Plunkett | 318/254 |
| 4,588,914 | 5/1986 | Heyne | 310/156 |
| 4,659,951 | 4/1987 | Angi et al. | 310/62 |
| 4,663,549 | 5/1987 | Suzuki | 310/67 R |
| 4,734,606 | 3/1988 | Hajec | 310/67 R |
| 4,868,434 | 9/1989 | Hayashi | 310/266 |

OTHER PUBLICATIONS

Panaflo by Panasonic, brochure from Panasonic Co., 425 E. Algonquin Rd., Arlington Hgts., Ill. 60005.

*Primary Examiner*—Peter S. Wong
*Assistant Examiner*—D. L. Rebsch
*Attorney, Agent, or Firm*—Ralph E. Krisher, Jr.

[57] ABSTRACT

A fan motor assembly provides axial air flow. A rotatable assembly including a substantially cylindric central portion supported for rotation about an axis coaxial with said central portion. The central portion has at least one permanent magnet element which rotates about the axis as the central portion rotates. The rotatable assembly further includes fan blades on an annular wall of the central portion and extending radially outwardly from the central portion. The annular wall and the central portion form an annular channel. The blades axially move air which is located about the outer periphery of the rotatable assembly as the rotatable assembly rotates. A stationary assembly includes a support for an annular core having a central opening to receive the central portion and having winding stages thereon in magnetic coupling relation with the permanent magnet element and electrically energized to generate an electromagnetic field, the core received within the annular channel of the rotatable assembly. The stationary assembly includes a bearing, centrally located on the support, for supporting the rotatable assembly for rotation about the axis.

46 Claims, 2 Drawing Sheets

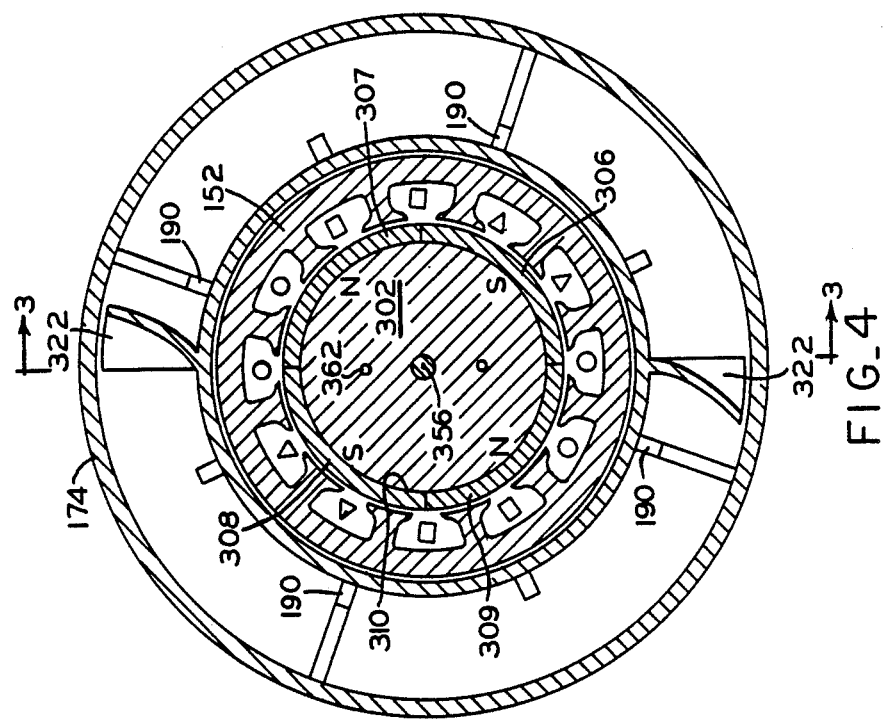
FIG_4
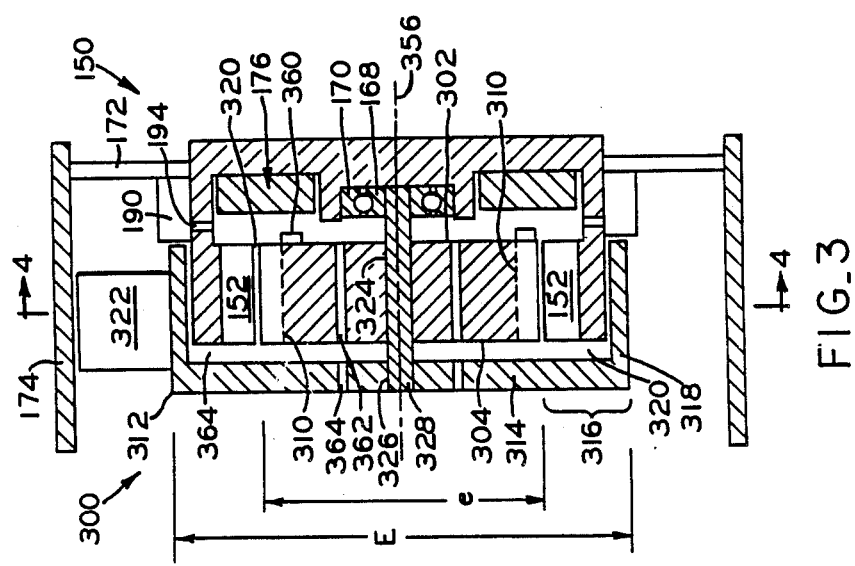
FIG_3

AXIAL FLOW FAN INTEGRAL WITH ELECTRONICALLY COMMUTATED MOTOR

FIELD OF THE INVENTION

The invention relates generally to dynamoelectric machines that utilize electronic commutation means and, more particularly, such machines integral with an apparatus to be driven such as a fan.

BACKGROUND OF THE INVENTION

Electronically commutated motors have been used to drive various types of apparatus, such as fans, by directly or indirectly coupling a shaft extending from the rotor assembly of the motor to the drive shaft of the fan. Although such motors are typically combined with the fan to provide a single assembly, such motors have not been integrated to the extent that the rotatable and stationary assemblies are separate, integral units of synthetic material formed around ferromagnetic components. Therefore, such motors are costly to manufacture and assemble.

Furthermore, the control circuitry required to electronically commutate a brushless AC motor is typically mounted remote from the motor or in proximity to the exterior of the rotatable assembly to permit cooling of the control circuitry. Such mounting results in an added cost to the motor and can cause an increase in the assembly time thereby resulting in additional cost.

SUMMARY OF THE INVENTION

Among the several objects of the invention may be noted the provision of a new and improved integral electronically commutated axial flow fan motor for use in axially moving air, such as the air within the housing of an electronic apparatus, to cool an apparatus; the provision of such an integral axial flow fan motor which can be manufactured inexpensively and can be quickly and efficiently assembled; the provision of an integral axial flow, permanent magnet, electronically commutated motor driven fan with parts made of synthetic resin so that the fan is lightweight and can be located at various points within an apparatus to move air to cool the apparatus and to operate at a low noise level; the provision of an integral fan motor for use as part of a system which will circulate air necessary to maintain the fan and system operating temperature within a specified range; the provision of such an integral fan/motor for cooling systems which is economical in cost, reliable in operation and which has reduced replacement cost.

In general, in one form of the invention, a stationary assembly includes an annular core having a central opening therein and having a plurality of winding stages thereon. The stationary assembly includes means for supporting a rotatable assembly for rotation about an axis coaxial with the central opening. The winding stages are adapted to be electrically energized to generate an electromagnetic field for rotating a rotatable assembly about the axis. The rotatable assembly includes a substantially cylindric central portion adapted to be received within the central opening and supported for rotation about an axis coaxial with the central opening. The central portion has at least one permanent magnet element which rotates about the axis as the central portion rotates. The element is in magnetic coupling relation with the winding stages. The rotatable assembly further includes a blade assembly on the central portion and extending radially therefrom. The blade assembly is spaced radially outwardly from the central portion. The blade assembly and the central portion define therebetween an annular recess for receiving the annular core. The blade assembly is adapted to axially move air which is located about the outer periphery of the rotatable assembly as the rotatable assembly rotates.

These as well as other objects and advantageous features will be in part apparent and in part pointed out hereinafter.

BRIEF DESCRIPTION OF THE DRAWINGS

FIG. 3 is an axial cross-sectional view of another embodiment of a fan motor of the invention; and FIG. 4 is a cross-sectional view transverse to the axis of the fan motor embodiment of FIG. 3 taken along lines 4—4.

Corresponding reference characters indicate corresponding parts throughout the several views of the drawings.

DETAILED DESCRIPTION OF THE PREFERRED EMBODIMENTS

Figure 2:
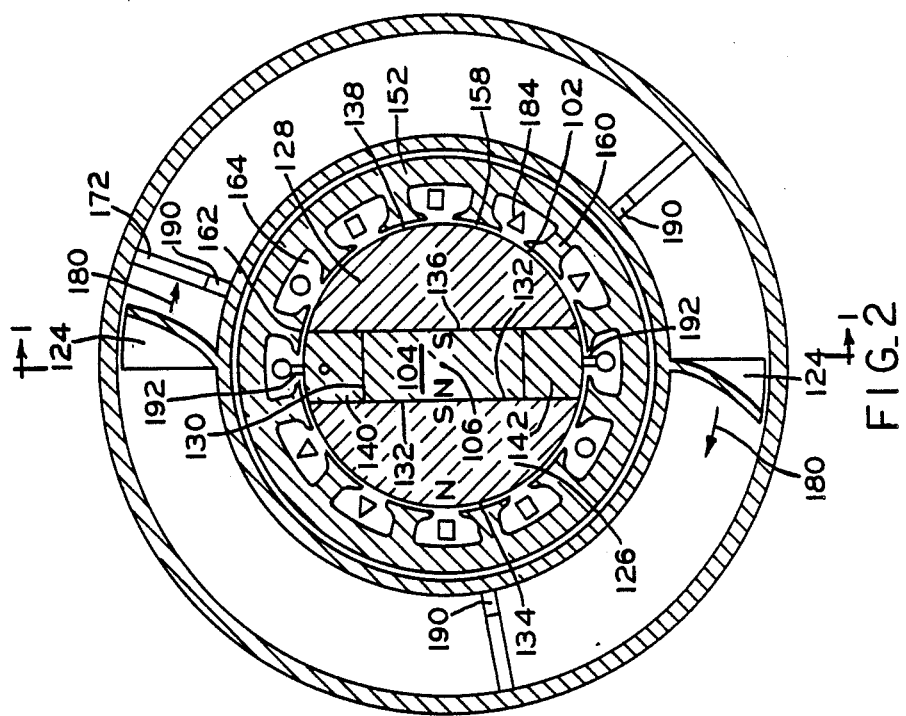
FIG. 2 is a cross-sectional diagram transverse to the axis of the fan motor embodiment of FIG. 1 taken along lines 2—2.
Figure 1:
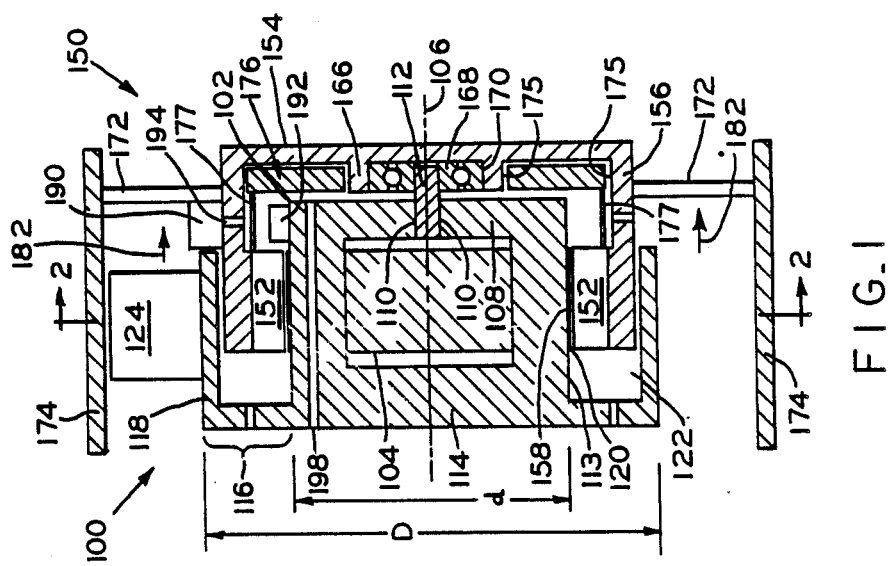
FIG. 1 is an axial cross-sectional diagram of one preferred embodiment of a fan motor of the invention.

Referring to FIGS. 1 and 2, one embodiment of a fan motor assembly according to the invention is illustrated. As shown in FIG. 1, reference character 100 generally refers to the rotatable assembly of the fan motor and reference character 150 generally refers to the stationary assembly of the fan motor. Rotatable assembly 100 includes a substantially cylindric central portion 102 received within and coaxial with central opening 158 of stationary assembly 150 and supported by shaft 112 for rotation about axis 106 coaxial with the central opening 158. Central portion 102 has at least one permanent magnet element 104 centrally located therein. Element 104 is positioned to rotate symmetrically about the axis of rotation 106 of the rotatable assembly 100 as the central portion 102 rotates. Element 104 is in magnetic coupling relation with winding stages of stationary assembly 150.

Central portion 102 comprises a relatively thin, nonferromagnetic, support disk 108 having a centrally located, axial bore 110 therein for receiving shaft 112 which supports portion 102 for rotation about axis 106. Shaft 112 is journaled for rotation in and supported by bearing 170. Shaft 112 constitutes means, centrally located on support wall 154 of stationary assembly 150, for supporting the rotatable assembly 100 for rotation about axis 106 coaxial with central opening 158. Central portion 102 also includes a hub 113 having a relatively thin, nonferromagnetic top disk 114 coaxial with support disk 108 and substantially parallel thereto and having a peripheral portion 116 of reduced thickness. The diameter D of top disk 114 is greater than the diameter d of the hub 113 and support disk 108 so that the peripheral portion 116 extends radially outwardly from top disk 114 beyond the outer peripheral surface 120 of hub 113. The outer end of peripheral portion 116 terminates in an annular wall 118 substantially perpendicular to top disk 114 and extending laterally toward support disk 108 coaxial with hub 113. Annular wall 118 and the outer peripheral surface 120 of central portion 102 define an annular recess 122 within rotatable assembly 100 for receiving a cylindrical core 152 of stationary assembly 150. Integral helical blades 124 extend radially outwardly from annular wall 118. Blades 124 are positioned laterally on an outer surface of the annular wall 118 and are circumferentially spaced at regular intervals about the annular wall 118.

Referring to FIG. 2, cylindric central portion 102 comprises first and second ferromagnetic, hemicylindric members 126, 128 having permanent magnet element 104 therebetween. First hemi-cylindric member 126 has an inner, substantially planar, peripheral surface 132 abutting against the north pole of permanent magnet element 104 and a curved, hemi-cylindric outer peripheral surface 134 forming a portion of the outer surface of hub 113. Due to the proximity of member 126 to permanent magnet element 104, inner surface 132 of member 126 has a south polarity resulting in outer surface 134 of member 126 having a north polarity. Similarly, second member 128 has an inner, substantially planar peripheral surface 136 abutting against the south pole of permanent magnet element 104 and a curved, hemi-cylindric outer peripheral surface 138 forming a portion of the outer surface of hub 113. Due to the proximity of member 128 to permanent magnet element 104, inner surface 136 of member 128 has a north polarity resulting in outer surface 138 of member 128 having a south polarity. Permanent magnet element 104 is a rectanguloid having substantially rectangular sides and is located between columnar supports 140 and 142 which interconnect the top disk 114 with support disk 108. Each columnar support has a substantially rectangular transverse cross-section with three planar sides facing members 126, 128 and element 104 and a curved side facing central opening 158 and forming a portion of the outer surface of hub 113.

Stationary assembly 150 includes means for supporting in the form of a relatively thin, planar support wall 154 in the shape of a disk coaxial with axis 106 and having an outer annular wall 156 coaxial with axis 106 and integral with and perpendicular to support wall 154 for supporting annular core 152 coaxial with axis 106. Core 152 has coaxial central opening 158 therein defined by a plurality of inwardly, radially projecting teeth 160 having faces 162 which form a surface defining central opening 158. Slots 164 are located between adjacent teeth 160 so that a plurality of winding stages 184 may be wound around teeth 160 in magnetic coupling relation to permanent magnet element 104. Winding stages 184 are adapted to be electrically energized to generate an electromagnetic field for rotating rotatable assembly 100 about axis 106.

Support wall 154 also includes an inner annular wall 166 concentric with outer annular wall 156 and coaxial with axis 106. Inner annular wall 166 is integral with and perpendicular to support wall 154 and defines a central opening 168 for receiving bearing 170 which supports shaft 112.

Radial support members 172 laterally extend from the outer periphery of outer annular wall 156 at regularly spaced intervals around the wall to support cylindrical casing 174 coaxial with both the rotatable assembly 100 and the stationary assembly 150. Stationary assembly 150 also includes control means, such as a toroidal printed wire board 176, located within an annular recess 175 defined between the inner and outer annular walls 156 and 166. Component board 176 is connected to the winding stages of core 152 via wires 177 and is also positioned between support wall 154 of stationary assembly 150 and central portion 102 of rotatable assembly 100. Board 176 is connected to a power source (not shown) and applies a voltage to one or more of the winding stages at a time and commutates the winding stages in a preselected sequence to rotate the rotatable assembly 100 about axis 106. Rotatable assembly 100 may rotate in either direction depending on the direction of pitch of helical blades 124 and the desired direction of air flow. For example, if rotatable assembly 100 rotates in a clockwise direction as indicated by arrows 180 in FIG. 2, axial airflow is provided through cylindrical housing 174 in the direction as indicated by arrows 182 in FIG. 1. As helical blades 124 rotate, the blades force air from rotatable assembly 100 toward stationary assembly 150 to move air through cylindrical casing 174.

Fans according to the invention which are employed to cool electrical equipment such as video display terminals generally have very low power consumption and, therefore, generate very little heat. Accordingly, dissipation of heat generated by the coil 152 and/or by the components on board 176 is unnecessary. In fans according to the invention which have high power consumption or otherwise generate heat, several options are available to alleviate increased temperatures of the coil and/or the components of the board. The stationary assembly 150 may be made of heat conductive material so that air moving over the stator as a result of rotation of the rotatable assembly 100 will cool the stationary assembly. In order to conduct heat away from stator 150, one or more heat conductive, radially outwardly projecting, heat dissipating fins 190 may be positioned on the outer periphery of outer annular wall 156. The air flow, indicated by arrow 182, moving over the fins caused by the rotation of helical blades 124 tends to cool the fins 190 to reduce any heat build up in the stationary assembly 150. In addition, fins 190 may be attached to or integral with radial support members 172. In addition, fins 190 may extend radially outwardly and attach to or be integral with the cylindrical casing 174 to support the casing in place.

Furthermore, one or more rotary fins 192 may be positioned on the outer periphery of hub 113 to circulate air located between stationary assembly 150 and rotatable assembly 100 and to move air over board 176. Fins 192 extend radially outwardly and are located between the coil 152 and the printed wire board 176 so that movement of the fin simultaneously moves the ambient air about the coil and the ambient air about the board. In addition, one or more radial apertures 194 may be located within outer annular wall 156 to permit air flow therethrough. In addition, one or more axial apertures 196 may be located within the central cylindrical portion 102 to permit air flow therethrough. These apertures permit air to flow over the board 176 to cool its components.

In one preferred embodiment, all portions of the rotatable assembly other than ferromagnetic members 126, 128 and permanent magnet element 104 are nonferromagnetic. For example, support disk 108, columnar supports 140, 142, top disk 114, edge portion 116, annular wall 118 and helical blades 124 comprise an integral, unitary (one-piece) structure made of plastic or other synthetic resin. Optionally, it is contemplated that all portions of stationary assembly 150, except for toroidal printed wire board 176, annular core 152 and winding stage 184 comprise an integral, one-piece structure of synthetic resin so that the fan motor assembly according to the invention constitutes a low-cost, light-weight structure.

First ferromagnetic hemi-cylindric member 126 is magnetically polarized by the north pole of permanent magnet element 104 resulting in the first inner peripheral edge surface 132 being magnetically polarized as a south pole attracted to the north pole of element 104. This, in turn, magnetically orders member 126 to result in the first outer peripheral edge surface 134 of first member 126 being magnetically polarized as a north pole. Similarly, second ferromagnetic hemi-cylindric member 128 is polarized by the south pole of permanent magnet element 104 resulting in the second inner peripheral edge surface 136 being magnetically polarized as a north pole attracted to the south pole of element 104. This, in turn, magnetically orders member 128 to result in the second outer peripheral edge surface 138 of second member 128 being polarized as a south pole. Consequently, the outer edge surfaces 134, 138 of members 126 and 128 form south and north poles, respectively, so that the central cylindric member 102 has the properties of a two-pole magnet rotor.

Referring to FIGS. 3 and 4, another preferred embodiment of the fan motor assembly according to the invention is illustrated. In the assembly of FIGS. 3 and 4, stationary assembly 150 has substantially the same configuration as stationary assembly 150 illustrated in FIGS. 1 and 2. Therefore, the same reference characters have been used for corresponding structure.

Reference character 300 generally refers to rotatable assembly of the fan motor and includes a cylindrical central portion 302 comprising a relatively flat, inner disk 304 eceived within and coaxial with central opening 158 of stationary assembly 150. A plurality of radially polarized, permanently magnetized elements 306, 307, 308 and 309 are positioned on the outer, cylindric peripheral surface 310 of central disk 304. The elements are positioned to rotate about the axis of rotation 356 of the rotatable assembly 300 as the central portion 302 rotates in magnetic coupling relation with winding stages of stationary assemblY 150.

Central disk 304 has a centrally located, axial bore 324 therein for receiving shaft 328 keyed to disk 304 which supports central portion 302 for rotation about axis 356. Disk 314 of the hub is provided with a bore 326 within which shaft 328 is keyed. Shaft 328 is journaled for rotation in and is supported by bearing 170.

Coaxial with central disk 304 is an annular hub 312 comprising a relatively flat, outer disk 314 having a diameter E which is greater than the diameter e of the combination of central disk 304 and the radiallY polarized elements 306-309 thereon. Therefore, disk 314 has a peripheral portion 316 which integrally, radially extends beyond the central disk 314 and terminates in an annular wall 318 perpendicular to disk 314 and extending laterally toward stationary assembly 150. The magnetized elements 306-309 of cylindrical central portion 302 and annular wall 318 define an annular recess 320 with rotatable assembly 300 for receiving cylindrical core 152 of stationary assembly 150. Integral helical blades 322 extend radially, outwardly from annular wall 318. Blades 322 are positioned laterally on an outer surface of the annular wall 318 and are circumferentially spaced at regular intervals about the annular wall 318.

As with the embodiment of FIGS. 1 and 2, several options are available to alleviate increased temperatures of the coil and/or the components of the board in the embodiment illustrated in FIGS. 3 and 4. The stationary assembly 150 may be made of heat conductive material so that air moving over the stator as a result of rotation of the rotatable assemblY 100 will cool the stationary assembly. In order to conduct heat away from stator 150, one or more heat conductive, radially outwardly projecting, heat dissipating fins 190 may be positioned on the outer periphery of outer annular wall 156. The air flow, indicated by arrow 182, moving over the fins caused by the rotation of helical blades 124 tends to cool the fins 190 to reduce any heat build up in the stationary assemblY 150. In addition, fins 190 may be attached to or integral with radial support members 172. In addition, fins 190 may extend radially outwardly and attach to or be integral with the cylindrical casing 174 to support the casing in place.

Furthermore, one or more rotary fins 360 may be positioned on the surface of inner disk 304 which faces the stationary assembly 150 so that the rotary fins 360 are located between stationary assembly 150 and rotatable assembly 100 to move air over board 176. In addition, one or more radial apertures 194 may be located within outer annular wall 156 to permit air flow therethrough. In addition, one or more axial apertures 362 may bellocated within the inner disk 304 to permit air flow therethrough. In addition, one or more axial apertures 364, in registry with apertures 362, may be located within outer disk 314 to permit air flow therethrough. These apertures permit air to flow over the board 176 to cool its components. Although an air sPace 364 between inner disk 304 and outer disk 314 is illustrated, it is contemplated that these disks maY be an integral, unitary structure without anY air space therebetween.

In one preferred embodiment, all portions of the rotatable assembly other than the Permanent magnet elements 306—309 are nonferromagnetic. For example, inner disk 304, outer disk 314, edge port.ion 316, peripheral wall 318 and helical blades 322 comprise an integral, unitary (one-piece) structure made of plastic or other synthetic resin. Optionally, it is contemplated that all portions of stationary assemblY 150, except for toroidal printed wire board 176, annular core 152 and winding stage 184 comprise an integral, one-piece structure of synthetic resin so that the fan motor assembly according to the invention provides a low-cost, light-weight structure.

In view of the above, it will be seen that the several objects of the invention are achieved and other advantageous results attained.

As various changes could be made in the above constructions without departing from the scope of the invention, it is intended that all matter contained in the above descriPtion or shown in the accompanYing drawings shall be interpreted as illustrative and not in a limiting sense.

What is claimed is:

1. A rotatable assembly for use with a stationary assembly including an annular core having a central opening therein and having a plurality of winding stages thereon and including means for supporting the annular core and said rotatable assembly for rotation about an axis coaxial with the central opening, said winding stages adapted to be electrically energized to generate an electromangetic field for rotating said rotatable assembly about the axis, said rotatable assembly comprising:

a substantially cylindric central portion adapted to be received within the central opening and supported for rotation about the axis coaxial with the central opening, said central portion having at least one permanent magnet element which rotates about the axis as the central portion rotates, said element being in magnetic coupling relation with the winding stages;

a blade assembly on said central portion and extending radially therefrom, said blade assembly spaced radially outwardly from said central portion, said blade assembly and said central portion defining therebetween an annular recess coaxial with the central opening for receiving said annular core, said blade assembly being adapted to axially move air which is located about the outer periphery of said rotatable assembly as said rotatable assembly rotates; and means, connected to the winding stages and positioned between the supporting means and said central portion of said rotatble assembly, for applying a voltage to one or more of the winding stages at a time and for commutating the winding stages in a preselected sequence to rotate the rotatable assembly about the axis of rotation.

2. A rotatable assembly for use with a stationary assembly including an annular core having a central opening therein and having a plurality of winding stages thereon and including means for supporting said rotatable assembly for rotation about an axis coaxial with the central opening, said winding stages adapted to be electrically energized to generate an electromagnetic field for rotating said rotatable assembly about the axis, said rotatable assembly comprising:

a substantially cylindric central portion adapted to be received within the central opening and supported for rotation about the axis coaxial with the central opening, said central portion having at least one permanent magnet element which rotates about the axis as the central portion rotates, said element being in magnetic coupling relation with the winding stages;

a blade assembly on said central portion and extending radially therefrom, said blade assembly spaced radially outwardly from said central portion, said blade assembly and said central portion defining therebetween an annular recess for receiving said annular core, said blade assembly being adapted to axially move air which is located about the outer periphery of said rotatable assembly as said rotatable assembly rotates; and a fin on said central portion extending radially laterally outward therefrom and located between said winding stages and the applying means, said fin adapted to simultaneously move ambient air of said winding stages and ambient air of said applying means thereby cooling said winding stages and said applying means.

3. The rotatable assembly of claim 1 wherein the applying means comprises a component board and the supporting means has an annular channel for receiving said component board.

4. The rotatable assembly of claim 1 further comprising a fin on said central portion extending radially laterally outward therefrom and located between said winding stages and the applying means, said fin adapted to simultaneously move ambient air of said winding stages and ambient air of said applying means thereby cooling said winding stages and said applying means.

5. The rotatable assembly of claim 1 further comprising a fin on said central portion extending axialy therefrom and located between said central portion and the applying means, said fin adapted to move ambient air of said applying means thereby cooling said applying means.

6. The rotatable assembly of claim 1 wherein said central portion comprises:

a first ferromagnetic member positioned within the central opening and having a first inner peripheral surface having a south polarity and having a first outer substantially curved, peripheral surface having a north polarity and positioned adjacent a surface of the annular core formed by the central opening; and a second ferromagnetic member positioned within the central opening and having a second inner peripheral surface having a north polarity and being opposite the first inner peripheral surface and having a second outer substantially curved, peripheral surface having a south polarity and positioned adjacent the surface of the annular core formed by the central opening.

7. The rotatable assembly of claim 6 further comprising at least one permanent magnet element located between said first and second inner peripheral surfaces and having a north pole adjacent said first inner peripheral surface and a south pole adjacent said second inner peripheral surface.

8. The rotatable assembly of claim 6 wherein each of said members is substantially planar, substantially hemicylindrical, with planar surfaces which are substantially parallel to each other, and further comprising:

a support disk positioned between said ferromagnetic members and the support means and having an axial bore therein;

a shaft supported by the support means and positioned within the bore;

a hub having a diameter greater than a diameter of the annular core of the stationary member having a peripheral portion radially extending beyond a peripheral edge of said support disk, said hub positioned substantially coaxial with said support disk with said first and second members located between said hub and said support disk; and means for interconnecting said support disk and said hub.

9. The rotatable assembly of claim 8 wherein said hub further comprises an annular wall defining an annular recess with said first and second outer peripheral surfaces for receiving said annular core.

10. The rotatable assembly of claim 9 wherein said means for interconnecting comprises first and second supports located between the first and second hemicylindrical portions.

11. The rotatable assembly of claim 10 wherein said hub further comprises a plurality of radially, outwardly projecting helical blades positioned laterally on an outer surface of the annular wall and circumferentially spaced about the annular wall.

12. The rotatable assembly of claim 11 wherein said disk, said supports, and said hub including said annular wall and said helical blades comprise an integral, unitary nonferromagnetic material.

13. The rotatable assembly of claim 8 wherein said support means of said stationary assembly includes a bearing supporting said shaft for rotation and an inner annular wall for receiving said bearing.

14. The rotatable assembly of claim 1 wherein said cylindric central portion comprises a central disk having a cylindric, peripheral surface and wherein said elements comprise a plurality of radially magnetized elements positioned on the peripheral surface of the central disk, and wherein said blade assembly comprises an annular hub coaxial with the central disk having fan blades thereon and terminating in an annular wall surrounding the annular core so that the recess for receiving said annular core is between said annular wall and said radially magnetized elements.

15. The rotatable assembly of claim 14 wherein said fan blades comprise a plurality of radially, outwardly projecting helical blades projecting laterally from an outer surface of the annular wall and circumferentially spaced about the annular wall.

16. The rotatable assembly of claim 14 further comprising a shaft, wherein said central disk and said annular hub each have bores for receiving said shaft and the supporting means includes a bearing supporting said shaft for rotation.

17. The rotatable assembly of claim 14 wherein said annular hub including said annular wall and said helical blades comprise an integral, unitary nonferromagnetic material.

18. The rotatable assembly of claim 1 wherein aid central portion has at least one aperture therein adapted to permit air in heat exchange relationship with the stationary assembly to flow through the aperture.

19. A fan motor assembly for providing axial air flow comprising:
a rotatable assembly including a substantially cylindric central portion supported for rotation about an axis coaxial with said central portion, said central portion having at least one permanent magnet element which rotates about the axis as the central portion rotates;
a blade assembly on said central portion and extending radially outwardly from said central portion, said central portion and said blade assembly defining therebetween an annular recess coaxial with the central opening, said blade assembly being adapted to axially move air which is located about the outer periphery of said rotatable assembly as said rotatable assembly rotates;
a stationary assembly including an annular core having a central opening therein adapted to receive said central portion and having a plurality of winding stages thereon in magnetic coupling relation with said permanent magnet element and adapted to be electrically energized to generate an electromagnetic field, said core adapted to be received within the annular recess of said rotatable assembly, said stationary assembly including means for supporting said annular core and said rotatable assembly for rotation about the axis; and
means, connected to the winding stages and positioned between the supporting means and said central portion of said rotatable assembly, for applying a voltage to one or more of the winding stages at a time and for commutating the winding stages in a preselected sequence to rotate the rotatable assembly about the axis of rotation.

20. A rotatable assembly for use with a stationary assembly including an annular core having a central opening therein and having a plurality of winding stages thereon and including means for supporting said rotatable assembly for rotation about an axis coaxial with the central opening, said winding stages adapted to be electrically energized to generate an electromagnetic field for rotating said rotatable assembly about the axis, said rotatable assembly comprising:
a substantially cylindric central portion adapted to be received within the central opening and supported for rotation about the axis coaxial with the central opening, said central portion comprising a central disk having a cylindric, peripheral surface and having a plurality of radially magnetized permanent magnet element positioned on the peripheral surface which rotate about the axis as the central portion rotates, said element being in magnetic coupling relation with the winding stages; and
a blade assembly on said central portion and extending radially therefrom, said blade assembly spaced radially outwardly from said central portion, said blade assembly and said central portion defining therebetween an annular recess coaxial with the central opening for receiving said annular core, said blade assembly being adapted to axially move air which is located about the outer periphery of said rotatable assembly as said rotatable assembly rotates, said blade assembly comprising an annular hub coaxial with the central disk having fan blades thereon and terminating in an annular wall surrounding the annular core so that the recess for receiving said annular core is between said annular wall and said radially magnetized elements.

21. The fan motor assembly of claim 19 wherein the applying means comprises a component board and the supporting means has an annular channel for receiving said component board.

22. The rotatable assembly of claim 19 further comprising a fin on said central portion extending radially laterally outward therefrom and located between said winding stages and the applying means, said fin adapted to simultaneously move ambient air of said winding stages and ambient air of said applying means thereby cooling said winding stages and said applying means.

23. The rotatable assembly of claim 19 further comprising a fin on said central portion extending axially therefrom and located between said central portion and the applying means, said fin adapted to move ambient air of said applying means thereby cooling said applying means.

24. The fan motor assembly of claim 19 further comprising a shaft, and wherein said central portion has a bore for receiving said shaft and said support means includes a bearing supporting said shaft for rotation.

25. The fan motor assembly of claim 24 wherein said support means includes an inner annular wall forming a central opening for receiving the bearing and an outer annular wall supporting the annular core, said inner and outer annular walls forming therebetween an annular channel for receiving said component board.

26. The fan motor assembly of claim 25 wherein said outer annular wall has at least one opening therein adapted to permit air in heat exchange relationship with the stationary assembly to flow through the opening.

27. The fan motor assembly of claim 19 wherein said central portion comprises:
a first ferromagnetic member positioned within the central opening and having a first inner peripheral surface having a south polarity and having a first outer substantially curved, peripheral surface having a north polarity and positioned adjacent a surface of the annular core formed by the central opening; and a second ferromagnetic member positioned within the central opening and having a second inner peripheral surface having a north polarity and being opposite the first inner peripheral surface and having a second outer substantially curved, peripheral surface having a south polarity and positioned adjacent the surface of the annular core formed by the central opening.

28. The fan motor assembly of claim 27 further comprising at least one permanent magnet element located between said first and second inner peripheral surfaces and having a north pole adjacent said first inner peripheral surface and a south pole adjacent said second inner peripheral surface.

29. The fan motor assembly of claim 27 wherein each of said members is substantially planar, substantially hemi-cylindrical, with planar surfaces which are substantially parallel to each other, and further comprising:
   a support disk positioned between said ferromagnetic members and said support means and having an axial bore therein;
   a shaft supported by the support means and positioned within the bore;
   a hub having a diameter greater than a diameter of the annular core of the stationary member and having a peripheral portion radially extending beyond a peripheral edge of said support disk, said hub positioned substantially parallel to and coaxial with said support disk with said first and second members located between said hub and said support disk; and means for interconnecting said support disk and said hub.

30. The fan motor assembly of claim 29 wherein said hub further comprises an annular wall defining an annular channel with said first and second outer peripheral surfaces for receiving said annular core.

31. The fan motor assembly of claim 30 wherein said means for interconnecting comprises first and second columnar supports located between the first and second hemi-cylindrical portions.

32. The fan motor assembly of claim 31 wherein said hub further comprises a plurality of radially, outwardly projecting helical blades positioned laterally on an outer surface of the annular wall and circumferentially spaced about the annular wall.

33. The fan motor assembly of claim 32 wherein said hub including said annular wall and said helical blades comprise an integral, unitary nonferromagnetic material.

34. The fan motor assembly of claim 29 wherein the support means includes a support disk coaxial with said rotatable assembly and a cylindric housing surrounding said rotatable assembly and supported thereabout by a plurality of radial suPPort members between said supPort disk and said housing.

35. The rotatable assembly of claim 19 wherein said central portion has at least one aperture therein adapted to permit air in heat exchange relationship with the stationary assembly to flow through the aperture.

36. The fan motor assembly of claim 19 further comprising at least one radially extending fin on said stationary assembly and in heat exchange relationship with air moved by said rotatable assembly.

37. The fan motor assembly of claim 19 wherein said cylindric central portion comprises an central disk having a cylindric, peripheral surface and wherein said elements comprise a plurality of radially magnetized elements positioned on the peripheral surface, and wherein said blade assembly comprises an annular hub coaxial with the central disk having fan blades thereon and terminating in an annular wall surrounding the annular core so that the annular recess for receiving said annular core is between said annular wall and said radially magnetized elements.

38. The fan motor assembly of claim 37 wherein said fan blades comprise a plurality of radially, outwardly projecting helical blades projecting laterally from the outer surface of the annular wall and circumferentially spaced about the annular wall.

39. The fan motor assembly of claim 37 further comprising a shaft, wherein said central disk and said annular hub each have bores for receiving said shaft and the supporting means includes a bearing supporting said shaft for rotation.

40. The fan motor assembly of claim 37 wherein said annular hub including said annular wall and said helical blades comprise an integral, unitary nonferromagnetic material.

41. A rotatable assembly for use with a stationary assembly including an annular core having an central opening therein and having a plurality of winding stages thereon and including means for supporting said rotatable assembly for rotation about an axis coaxial with the central opening, said winding stages adapted to be electrically energized to generate an electromagnetic field for rotating said rotatable assembly about the axis, said rotatable assembly comprising:
   a first ferromagnetic member positioned within the central opening and having a first inner peripheral surface having a south polarity and a first outer substantially curved, peripheral surface having a north polarity positioned adjacent a surface of the core formed by the central opening;
   a second ferromagnetic member positioned within the central opening and having a second inner peripheral surface having a north polarity and being opposite the first inner peripheral surface and a second outer substantially curved, periphral surface having a south polarity and positioned adjacent a surface of the core formed by the central opening; and
   a blade assembly on said central portion and extending therefrom, said blade assembly spaced radially outwardly from said first and second outer peripheral surfaces, said member and said blade assembly defining an annular recess coaxial with the central opening for receiving said annular core when said first and second members are positioned within the central opening, said blade assembly adapted to axially move air which is located about the outer periphery of said rotatable assembly as the rotatable assembly rotates.

42. The rotatable assembly of claim 41 further comprising at least one permanent magnet element located between said first and second inner peripheral surfaces and having a north pole adjacent said first inner peripheral surface and a south pole adjacent said second inner peripheral surface.

43. The rotatable assembly of claim 41 further comprising control means, connected to the winding stages and adapted to be positioned between the supporting means and said central portion and said rotatable assembly, for applying a voltage to one or more of the winding stages at a time and for commutating the winding stages in a preselected sequence to rotate said rotatable assembly about the axis of rotation.

44. The rotatable assembly of claim 41 wherein each of said members is substantially planar, substantially hemi-cylindrical, with planar surfaces which are substantially parallel to each other, and further comprising: a support disk positioned said ferromagnetic members and the support means and having an axial bore therein;
- a shaft supported by the support means and positioned within the bore
- a hub having a diameter greater than a diameter of the annular core of the stationary member having a peripheral portion radially extending beyond a Peripheral edge of said support disk, said hub positioned substantially coaxial with said support disk with said first and second members located between said hub and said support disk; and means for interconnecting said bottom disk and said top disk.

45. The rotatable assembly of claim 44 wherein said hub further comprises an annular wall defining an annular channel with said first and second outer peripheral surfaces for receiving said annular core.

46. The rotatable assembly of claim 45 wherein said hub further comprises a plurality of radially, outwardly projecting helical blades projecting laterally from an outer surface of the annular wall and circumferentially spaced about the annular wall.

* * * * *